(12) United States Patent
Jahnke et al.

(10) Patent No.: US 6,508,263 B1
(45) Date of Patent: Jan. 21, 2003

(54) FLOAT OPERATED FUEL TANK VAPOR VENT VALVE

(75) Inventors: Russell C. Jahnke, Ann Arbor, MI (US); Maxim V. Zorine, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/957,600

(22) Filed: Sep. 20, 2001

(51) Int. Cl.⁷ ............................................... F16K 24/04
(52) U.S. Cl. ......................................... 137/202; 137/43
(58) Field of Search ..................................... 137/43, 202

(56) References Cited

U.S. PATENT DOCUMENTS 5,404,907 A    4/1995  Benjey et al. .............. 137/587
5,439,023 A  *  8/1995  Horikawa .................... 137/202
5,755,252 A      5/1998  Bergsma et al. ............ 137/202
5,960,816 A     10/1999  Mills et al. ................. 137/202
6,371,146 B1 *   4/2002  Benjey ........................ 137/202

\* cited by examiner

Primary Examiner—Gerald A. Michalsky
(74) Attorney, Agent, or Firm—Roger A. Johnston

(57) ABSTRACT

The float has an elastomeric valve disk with an annular bead rim caged for limited lost motion movement on the top of the float. A rigid backing plate for the valve disk is pivoted on a curved surface on the top of the float to ensure self-alignment of the valve disk on the vent port seat when the float is moved upward by the rising liquid level for closing the vent during refueling. As fuel is used from the tank, the float drops and the angled top of the cage contacts the bead rim on the valve disk and effects a peel-away re-opening of the valve.

2 Claims, 3 Drawing Sheets

FLOAT OPERATED FUEL TANK VAPOR VENT VALVE

BACKGROUND OF THE INVENTION

The present invention relates to vent valves for fuel tanks, particularly fuel tanks for motor vehicles where it is required to control the venting of the fuel vapor to prevent escape to the atmosphere. Current production passenger cars and light trucks employ a: vapor storage device such as a canister filled with granular carbon for storing vapor during periods of engine shutdown for subsequent purge to the engine air inlet upon engine startup. Such systems employ a float operated vent valve in the tank to control the flow to the canister of fuel vapor in the vapor dome above the liquid level and particularly during refueling.

It is necessary to prevent liquid fuel from entering the vapor vent lines to the canister to prevent liquid blockage of the vapor vent lines. During refueling if the filler tube for refueling is completely filled to the top of the filler neck, which typically extends to a level above the top of the fuel tank, there is a danger that liquid fuel will flow through the vapor vent valve and enter and block the vapor vent lines.

In order to prevent liquid fuel from entering the vapor vent lines and potentially blocking the vent lines, it has been found satisfactory to provide a float operated vent valve which closes the vapor vent upon the fuel level reaching a predetermined level in the tank which can be chosen to be slightly below the top wall of the tank.

Known float operated vapor vent valves for fuel tanks have employed a disk or wafer type valve element caged on the top of the float, for limited lost motion with respect to the float, for sealing against a valve seat provided on the vapor vent line port at the; top of the fuel tank. However, in view of the minimal force applied by the float to the valve element by the forces of buoyancy acting on the float, it has been quite difficult to provide a complete seal and some leakage has been experienced.

The known valve constructions have employed an inclined or offset configuration to the cage to provide a peel-away action for the valve disk as the float is lowered by the falling level of the liquid as fuel is drawn from the tank during engine operation to ensure reopening of the vent line port after closure during refueling. Heretofore, the valve disk member has been formed of plastic material in order to prevent "corking" of the valve member on the port.

In such valves, where there is any angular misalignment between the top of the float and the vent port valve seat, it has been difficult to enable the float to completely close the valve member against the port valve seat. Thus, it has been desired to provide a way or means of ensuring a positive closure and seal of a float operated fuel vapor vent valve upon filling the tank during refueling and to ensure reopening of the vent port upon the fuel level falling from subsequent withdrawal of the fuel from the tank during engine operation.

BRIEF SUMMARY OF THE INVENTION

The present invention provides a solution to the above-described problem with a float operated vent valve having a resilient elastomeric valve member with a thin flexible central region and an annular bead formed on the periphery with a rigid plate or disk contacting the annular bead during upward movement of the float to cause the central portion of the elastomeric member to seal on the vapor vent lock port valve seat in the top of the fuel tank. The valve member is caged upon the float for limited lost motion with respect to the float and the cage is configured with an inclined or offset upper portion to effect a peel-away action against the annular bead as the float moves downward during subsequent withdrawal of fuel from the tank. The rigid backing plate for the valve member is free to pivot about a fulcrum surface provided on the top of the float to effect self-alignment of the valve member on the vent port valve seat.

DETAILED DESCRIPTION OF THE INVENTION

Figure 1:
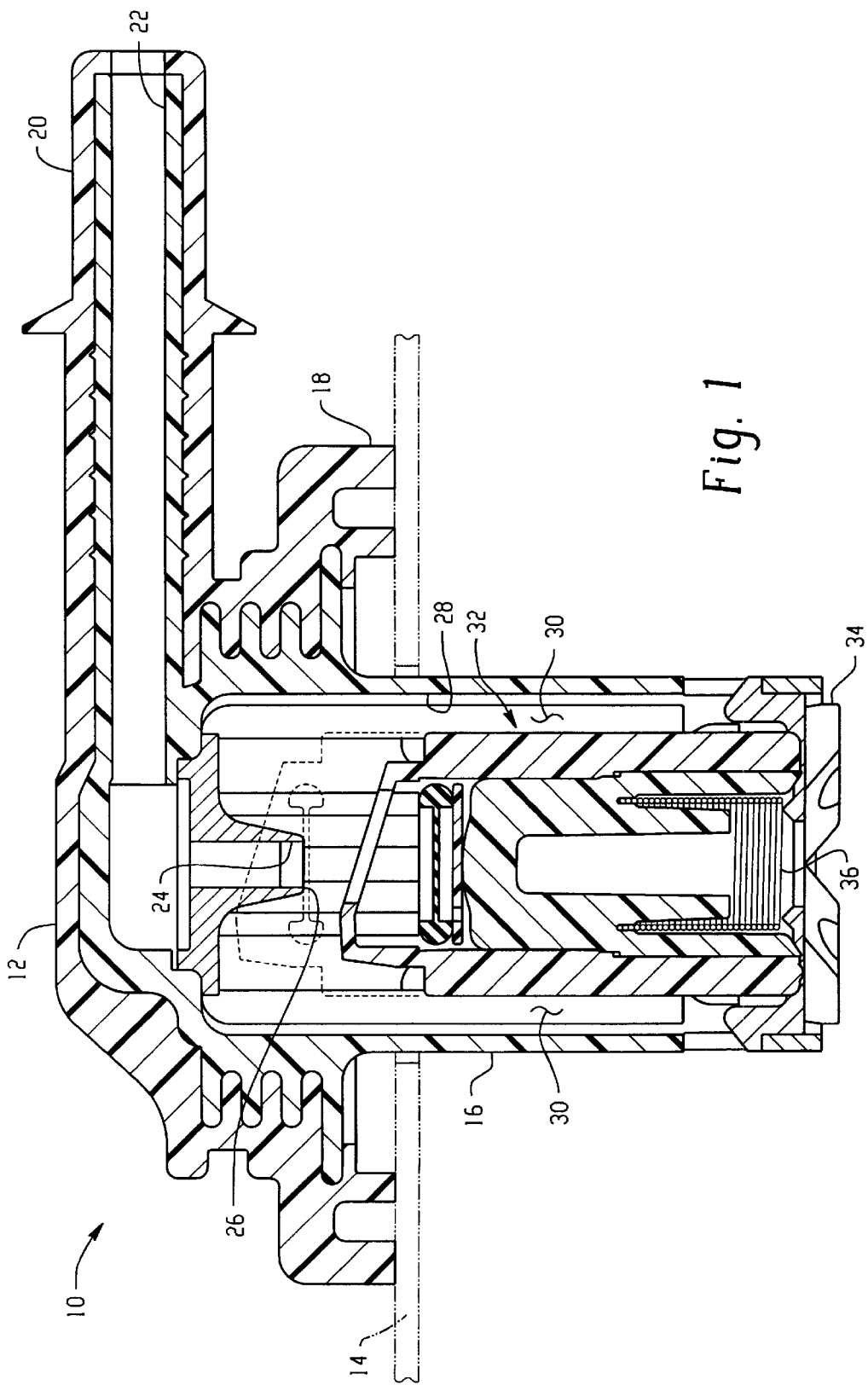
FIG. 1 is a cross-section of the valve assembly of the present invention.

Referring to FIG. 1, the valve assembly of the present invention is indicated generally at 10 and has a valve body with an upper portion 12 which is mounted externally of the fuel tank top wall indicated by dashed outline at 14 and a downwardly extending portion 16 which extends through an access opening formed in the tank topwall 14. The upper portion of the body 12 has an annular flange 18 formed thereon which has the undersurface thereof registering against the outer surface of the tank wall 14; and, flange 18 is adapted for sealing attachment thereto as, for example, by non-metallic weldment as is known in the art for non-metallic tanks.

The upper portion of body 12 has provided thereon an attachment fitting 20 suitable for receiving thereover a hose (not shown) for connection to a canister (not shown). Fitting 20 has formed therethrough a vapor passage 22 which communicates with a vent port 24 formed in a valve seat 26 provided therearound. The lower portion of the valve body 16 has a hollow or cavity or 28 formed therein which communicates with the valve seat 26; and, the lower portion 16 has formed therein a plurality of spaced vertically extending guide ribs 30.

A float assembly indicated generally at 32 is slidably received in the ribs 30 and is illustrated in solid outline in FIG. 1 in its downward or lowered position and in dashed outline in its upward position when the fuel tank is filled with liquid fuel.

The float assembly 32 is retained in the cavity 28 by a suitable retainer 34. A spring 36 is disposed between retainer 34 and the float assembly 32 and is configured and calibrated to bias the float assembly 32 in an upward direction to provide the desired buoyancy for the density of the particular fuel to be used in the tank.

Figure 2:
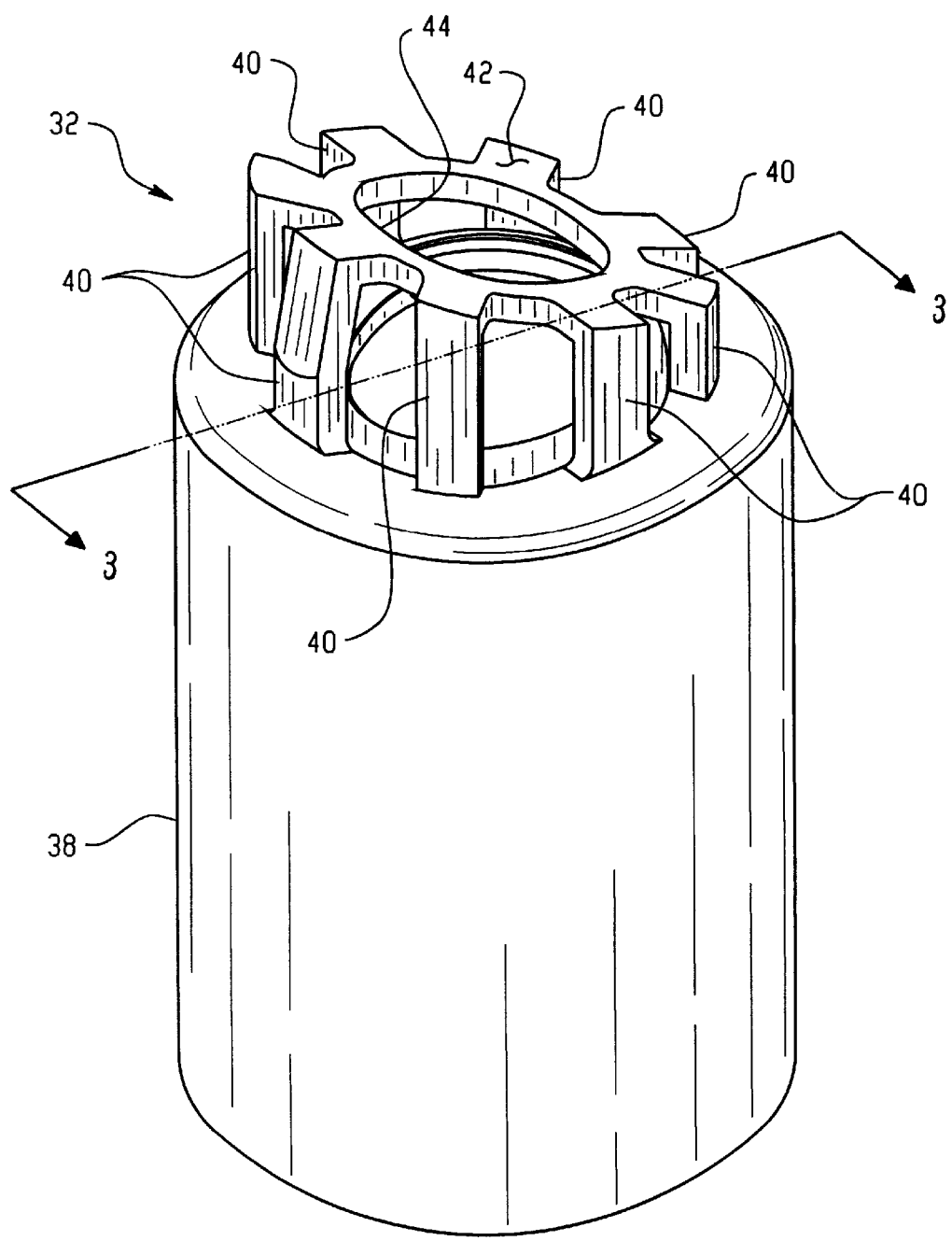
FIG. 2 is a perspective view of the float assembly of the present invention; and, FIG. 3 is a section view of the float assembly of FIG. 2.
Figure 3:
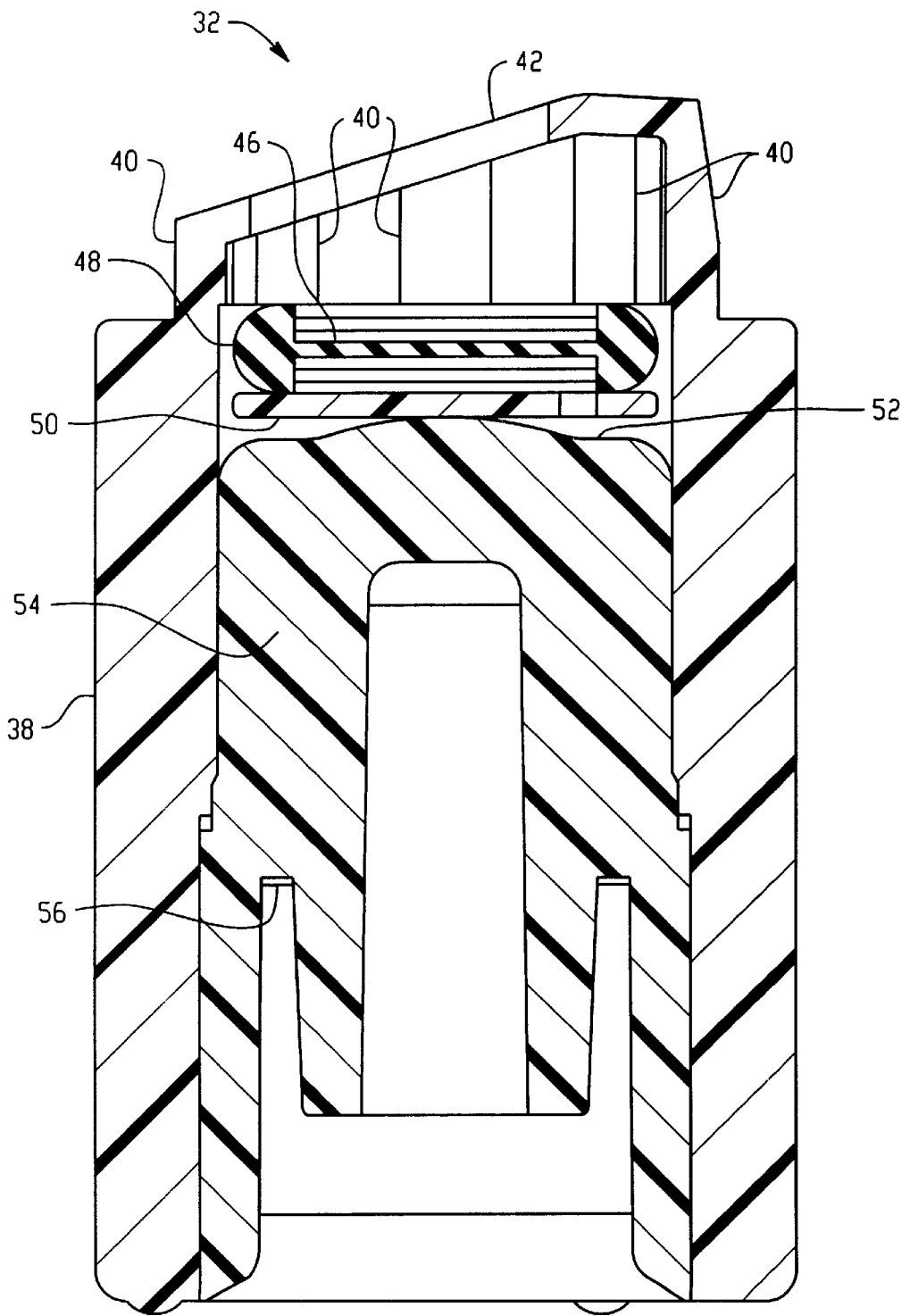

Referring to FIGS. 2 and 3, the float assembly 32 is illustrated in greater detail and has a generally cylindrically shaped hollow outer shell 38 which has its outer diameter sized to slidably fit in the ribs 30 provided in the lower portion 16 of the body. The upper portion of the shell 38 is configured as a ribbed cage having circumferentially spaced uprights 40 disposed thereabout which are attached at their upper ends to an inclined top portion 42 which has a central clearance aperture 44 therein which is sized to permit the valve seat 26 to pass therethrough.

A flexible valve member 46 is disposed in a caged formed by the uprights 40 and top 42. The valve member 46 has a generally thin central section surrounded by an annular bead or rim 48. In the present practice of the invention the valve member 46 and bead 48 are formed integrally as one piece of fluorosilicon or fluorocarbon elastomer, although other seal materials may be employed suitable for the particular fuel to be used.

A backing plate 50 is disposed between the valve member 46 and the top of shell 38 and contacts the undersurface of the annular bead 48. The underside of the backing plate 50 is contacted by a curved fulcrumming surface 52 provided on the top of buoyant float member 54 which is secured in the interior of the shell 38. Float member 54 has an annular groove in the bottom thereof denoted by reference numeral 56 which has the upper end of the spring 36 received therein. The material for the float 54 is chosen for its density with relation to the density of the fuel to be employed in the tank 14 in order to provide the desired buoyancy.

The backing plate 50 is free to pivot on the fulcrum surface 52 and thus provides angular self alignment of the valve member 46 with respect to valve seat 26 when the float assembly 32 is moved to the upward position shown in dashed outline in FIG. 1.

It will be understood that with the float in the upward position and valve member 46 sealed on the valve seat 26 by the buoyancy forces acting on the float assembly that upon subsequent withdrawal of fuel from the tank and lowering of the float assembly 32, the undersurface of the top 42 of the float shell 38 contacts one side of the annular bead 48 effecting a peel-away movement from valve seat 26 thus ensuring reopening of the vent passage 22.

The present invention thus provides a unique and novel float operated valve assembly for fuel tank vapors which provides a secure sealing of the tank vent upon filling of the tank by use of a resilient elastomer valve member. The annular bead rim provided on the valve member is contacted by a backing plate for closing upon complete refueling and by an inclined surface of the cage on the float to ensure reopening of the vent upon lowering of the float when fuel is withdrawn from the tank.

Although the invention has hereinabove been described with respect to the illustrated embodiments, it will be understood that the invention is capable of modification and variation and is limited only by the following claims.

What is claimed is:

1. A float operated vent valve assembly for a fuel tank comprising:
   (a) a valve body defining a vent passage therethrough and adapted for attachment over and sealing about an access opening in the top of a fuel tank with the vent passage communicating with the access opening;
   (b) a float assembly disposed for vertical movement with respect to the valve body and having,
      (i) a float body disposed for relative movement with respect to the vent passage,
      (ii) a cage on the top of the float body and capturing therein a flexible valve member for limited movement relative to the float body
      (iii) a rigid plate disposed between the top of the float body and the valve member and wherein upon upward movement of the float body said rigid plate contacts said flexible valve member and effects sealing of said valve member on said vent passage and upon downward movement of said float body said cage is operative to effect a peel-away movement of said flexible valve member from said vent passage, wherein said rigid plate is contacted by a fulcrumming surface on the top of the float body and said rigid plate is free to pivot thereon.

2. A float operated vent valve assembly for a fuel tank comprising:
   (a) a valve body defining a vent passage therethrough and adapted for attachment over and sealing about an access opening in the top of a fuel tank with the vent passage communicating with the access opening;
   (b) a float assembly disposed for vertical movement with respect to the valve body and having,
      (i) a float body disposed for relative movement with respect to the vent passage,
      (ii) a cage on the top of the float body and capturing therein a flexible valve member for limited movement relative to the float body,
      (iii) a rigid plate disposed between the top of the float body and the valve member and wherein upon upward movement of the float body said rigid plate contacts said flexible valve member and effects sealing of said valve member on said vent passage and upon downward movement of said float body said cage is operative to effect a peel-away movement of said flexible value member from said vent passage, wherein said float body has a curved fulcrumming surface formed on the top thereof and said rigid plate is contacted by said fulcrumming surface on said upward movement of the float body.

* * * * *